United States Patent

Kessler et al.

[15] 3,670,634
[45] June 20, 1972

[54] APPARATUS FOR ELECTRONIC EXPOSURE CONTROL

[72] Inventors: Arthur Kessler, Grosse Altenstadten; Peter Lorseries, Diez, both of Germany

[73] Assignee: Ernst Leitz GmbH, Wetzlar, Germany

[22] Filed: May 5, 1970

[21] Appl. No.: 34,723

[30] Foreign Application Priority Data

July 18, 1969 Germany...................P 19 36 544.7

[52] U.S. Cl. ............................95/10 C, 95/10 CT, 95/53 EB
[51] Int. Cl. .........................................................G03b 7/02
[58] Field of Search..........................95/10 C; 338/137, 171

[56] References Cited

UNITED STATES PATENTS

| | | | |
|---|---|---|---|
| 3,583,302 | 6/1971 | Loseries | 95/53 EB |
| 3,386,358 | 6/1968 | Kropp | 95/10 C |
| 3,528,351 | 9/1970 | Konig et al. | 95/10 C |

*Primary Examiner*—Samuel S. Matthews
*Assistant Examiner*—Russell E. Adams, Jr.
*Attorney*—Krafft & Wells

[57] ABSTRACT

An apparatus for electronic exposure control in photographic cameras comprising a measuring circuit in the form of a resistance bridge circuit including meter, and a timing circuit, which includes a resistance-capacitor combination (RC-combination). Only one variable resistance is provided for the two circuits which is an exponentially variable resistance having two wipers. The two wipers are electrically isolated from one another, and one wiper is included in the measuring circuit, the other one in the timing circuit. In dependence on the film speed and/or the selected F-stop number of wipers are adjusted to a predetermined position relative to one another, and in this position they are together movable across the windings of the resistance.

6 Claims, 4 Drawing Figures

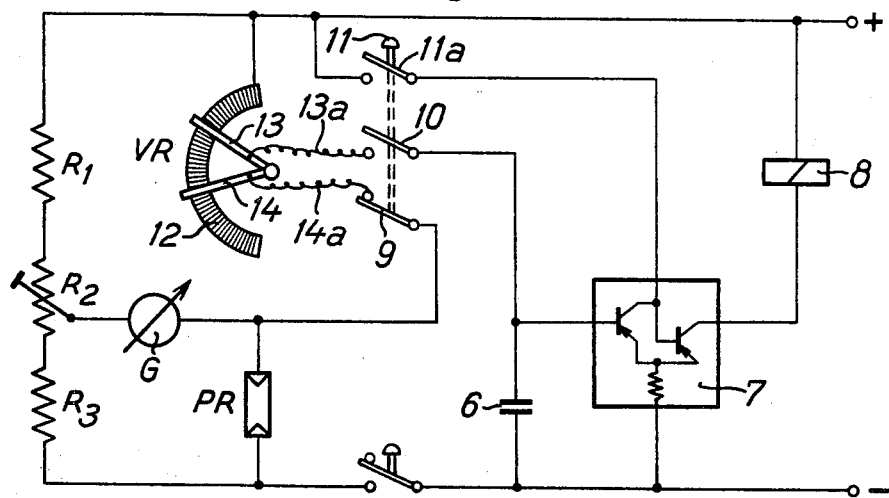
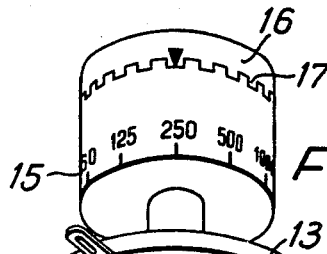
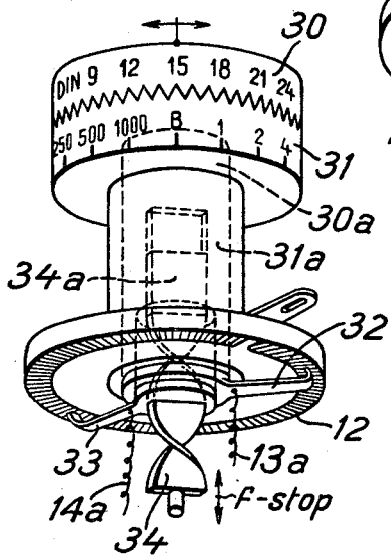
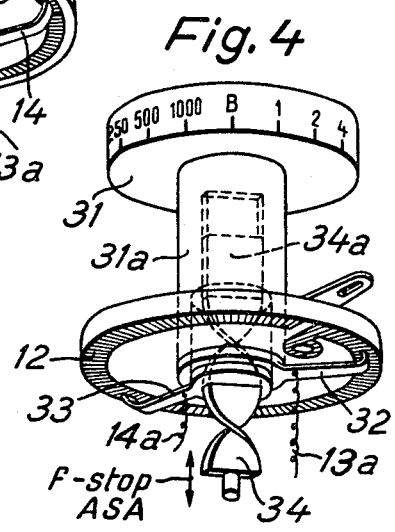

APPARATUS FOR ELECTRONIC EXPOSURE CONTROL

BACKGROUND OF THE INVENTION

The invention pertains to photographic cameras and is particularly concerned with light metering and, in dependence thereon, with the automatic electronic control of the camera shutter.

Shutters in photographic cameras which are opened by the camera operator and which are thereafter, sooner or later, closed by electronic means in accordance with the prevailing light conditions are already known in the art. The electronic means usually comprise a solenoid which keeps the shutter open after it has been mechanically opened and which allows the shutter to close when the solenoid becomes energized. Energizing and deenergizing of the solenoid is controlled by an electronic circuit which comprises an RC-combination wherein the resistance R is a photoelectric resistance. Such a circuit is described, for example, in U.S. Pat. No. 3,343,043.

It is a disadvantage, however, that such a circuit only works if light is incident on the photoelectric resistance during the exposure period. This means that such a circuit cannot be used in cameras wherein the light is metered through the taking lens of the camera because in such cameras the photoelectric resistance must be withdrawn from the path of the image forming light rays prior to the opening of the shutter. Consequently, the resistance will not receive any light during the exposure period. The same is true, for example, in single lens reflex cameras wherein the photoelectric resistance is rigidly mounted and is illuminated via the reflex mirror. Prior to the opening of the shutter the reflex mirror must be swung upwards so that here again the photoelectric resistance will remain in the dark during the exposure period.

Further, such a circuit can also not be used with cameras performing a light measurement only in a certain part of the object to be photographed, i.e., a so-called partial measurement as against a so-called integral measurement, even if the photoelectric resistance receives light during the exposure. This is because during the exposure the object detail whose brightness is then measured may not be the really important detail to the brightness of which the exposure time must be adjusted.

Therefore, it is already known in the art to subdivide the electronic circuit into a measuring circuit and a timing circuit. The brightness of the object is then first measured by means of the measuring circuit and some value which is proportional to the object brightness is stored. This stored value is thereafter introduced into the timing circuit where it determines the time lapse after which the solenoid is energized, counted from the opening of the shutter. In practice the stored value is always the resistance value of a variable resistance which is adjusted during the light measurement so that it is equal to the resistance value of the photoelectric resistance in the measuring circuit. The variable resistance is thereafter switched into the timing circuit where it represents the R in a RC-combination.

The F-stop value and the film speed may be photoelectrically introduced into the measuring circuit as far as the F-stop value is concerned. This is done automatically in cameras wherein the light measurement is performed through the so-called "working diaphragm," i.e., through the diaphragm closed down to the F-stop number which is actually used for taking the picture. But the film speed must still be introduced photometrically, which may present some difficulty. It is also possible, however, to introduce the film speed into the measuring circuit by means of a variable resistance, but this would require an additional exponential resistance.

If the film speed, on the other hand, is introduced directly into the timing circuit, which is also known in the art, only a small range of introduction will be achieved and a separate additional calibrated resistance is here again required.

It is therefore an object of the present invention to provide a circuit combination of the above described type wherein a substitute resistance is switched from the measuring circuit into the timing circuit and wherein the film speed is introduced into the circuits by means of a variable resistance, in which circuit combination only one exponential resistance is used both for a substitute resistance and for film speed introduction.

SUMMARY OF THE INVENTION

The above stated object is attained by providing a variable exponential resistance which has two wipers. The wipers are electrically isolated from one another and one wiper is connected to the measuring circuit while the other wiper is connected to the timing circuit. Both wipers are adjustable in their position relative to one another, and they are together movable across the windings of the resistance in their preset position. The difference in position between the two wipers is proportional to the speed of the film in the camera. This will be readily understood from the following explanation. Basically speaking the product of exposure time and light intensity is constant for a given film speed and must be lower if the film speed is higher, which means that this product is inversely proportional to the film speed: This may be written in the equation $$t \cdot E = \text{constant} \approx (1)/\text{ASA}$$

wherein t represents the exposure time and E stands for the light intensity on the film. From this line follows $$t \approx (1)/(E \cdot \text{ASA})$$

and since the exposure time t is directly proportional to the resistance value of the resistance $R_t$ in the electronic timing circuit and on the other hand the expression $(1)/(E)$ is directly proportional to the resistance value of the photoelectric resistance in the measuring circuit the above equation may be rewritten as $$R_t \approx R_e \cdot 1/\text{ASA}$$

The resistance value $R_t$ needed in the timing circuit for establishing the correct exposure time can thus be obtained from the resistance value of the photoelectric resistance multiplied by a factor which is inversely proportional t the film speed, provided, of course, the photoelectric to has a slope exponent of 1.

These conditions can be met if two wipers are attached to only one exponential resistance and are together moved across the resistance windings at a distance from one another which is proportional to the film speed. One of the wipers is then effective in the measuring circuit and adjusts the variable resistance to a resistance value which is proportional to the resistance value of the photoelectric resistance. The other wiper is effective in the timing circuit and adjusts the variable resistance to the resistance value needed for the formation of the shutter time.

A variable resistance of the above described type is needed in a camera with through the lens metering of the light conditions with the working-diaphragm.

A slightly modified version of the resistance is needed if the light measurement is performed with a fully open diaphragm in a camera comprising a taking lens having a diaphragm preselection ring. In single lens reflex cameras of this type the preselected F-stop value has to be transmitted to the measuring circuit in one way or the other. Usually this is done by a cam-controlled displacement of a rod or some other mechanical element. In the present invention this problem is solved by making the distance between the two wipers not only proportional to the film speed, but to the film speed plus the f-stop value as well. The wiper which was formerly only adjustable in its position in accordance with the film speed is now made additionally rotatable in dependence on the setting of the diaphragm preselection ring.

BRIEF DESCRIPTION OF THE DRAWINGS

The invention will be more fully comprehended from the following description when taken in conjunction with the appending drawings, wherein:

FIG. 1 shows schematically the measuring circuit and the timing circuit of an apparatus for electronic exposure control, including the variable resistance with two wipers, FIG. 2 is a schematic perspective view of the film speed setting knob and the exposure time setting knob for a camera with light metering through the working diaphragm in combination with the variable resistance, FIG. 3 is a variable perspective view of the film speed setting knob and the exposure time setting knob for a camera with light metering through the fully open diaphragm in combination with the variable resistance, in a first embodiment, and FIG. 4 is a schematic perspective view of the exposure time setting knob for a camera with light metering through the fully open diaphragm in combination with the variable resistance, in a second embodiment.

DESCRIPTION OF THE PREFERRED EMBODIMENTS

Referring now to FIG. 1, the measuring circuit of the shown circuitry comprises two ohmic resistances $R_1$ and $R_3$, a photoelectric resistance PR and a variable resistance VR which are interconnected in a Wheatstone bridge. In the diagonal branch of the bridge there is a galvanometer G which is on one side connected to a second variable resistance $R_2$. The galvanometer G indicates in a known manner the balance or imbalance of the bridge and the resistance $R_2$ is made variable so that variations in the photoelectric resistance PR may be compensated for.

The timing circuit of the shown circuitry comprises an RC-combination wherein the variable resistance VR represents the R and the capacitor 6 represents the C. The voltage level of the RC-combination is supplied to a Schmitt trigger 7 and a solenoid 8 is connected to the trigger by which it is energized when the trigger is in its conductive state.

From FIG. 1 it can thus be seen that the variable resistance VR is an element in the measuring circuit as well as in the timing circuit. The resistance VR may be connected to one of the two circuits by means of two switches 9 and 10 which are alternatingly open and closed. Both switches are mechanically connected to a button 11 which represents the shutter release button of the camera. The camera itself is not shown in detail for sake of simplicity. Button 11 is further connected to a switch 11a which, when closed, connects the trigger 7 to the battery.

The switch 9, by means of which the resistance VR is connected to the measuring circuit, is normally closed, i.e., it is closed when the button 11 is not pressed down. The switch 10, which connects the resistance VR to the timing circuit, is, on the other hand, normally open and becomes closed only when the button 11 is operated.

FIG. 2 shows the variable resistance VR in a perspective view. It comprises the ring-shaped windings 12 made of resistance wire and of two wipers 13 and 14. The wipers are electrically isolated from one another and are connected to the two circuits respectively by wire connections 13a, 14a via the switches 9 and 10 (FIG. 1). The wipers 13 and 14 slide across the windings 12 with different radii so that each wiper can move free from the other.

The wiper 13 is rigidly connected to the shutter time setting knob 15 while the wiper 14 is connected to the film speed setting knob 16. Both knobs are coaxially arranged and are turnable relative to one another. A resilient detent 17 is effective between the two knobs so that the knobs may be rotated as a unit after the film speed has been set previously by a relative movement between them A relative movement between the two knobs also varies the angular distance between the two wipers so that the difference of the resistance value adjusted by the wipers remains proportional to the film speed. This is particularly true if the exposure control apparatus is designed for use in a camera wherein light metering through the lens is performed with the working-diaphragm. If, however, light metering is done with the open-diaphragm, i.e., with the largest aperture available in the lens, regardless of the actual F-stop value to which the diaphragm is closed down prior to the exposure, the actual F-stop value may be taken into account by varying the angular distance of the wipers not only in dependence on the film speed but additionally also in dependence on the preselected F-stop value.

An embodiment of the variable resistance VR with a wiper which is adjustable also in dependence on the F-stop value is illustrated in FIG. 3. This embodiment comprises a film speed setting knob 30 coaxially arranged with a shutter time setting knob 31. A wiper 32 is rigidly connected to the hollow shaft 31a of the shutter time setting knob 31. A second wiper 33 is mounted freely rotatable at the end of the shaft 30a which is connected to the film speed setting knob 30. The wiper 33 is provided with a rectangular hole in its central position and a twisted strip 34, having a cross section of the hole extends therethrough. The front end 34a of the strip 34, however, is not twisted but straight and with this straight end the strip is guided linearly in axial direction in a corresponding bore in the center of shaft 30a.

It will be readily understood that the strip 34 is thus not only rotatable together with the film speed setting knob but also axially displaceable in dependence on the preselected F-stop value. Both movements will result in an angular adjustment of the wiper 33, the position of which is thus proportional to the film speed, which is set by timing knob 30, as well as to the F-stop value.

Particular attention is drawn to the fact that the pitch resulting from twisting the strip 34 must not be constant but can deliberately be made varying. This can provide a method of introducing correction adjustments.

In FIG. 4 there is shown a second embodiment wherein one wiper is adjustable in its angular position in dependence on the film speed and in dependence on the preselected F-stop value. This embodiment comprises a shutter time setting knob 31 only to the shaft of which the wiper 32 is again rigidly mounted. Angular displacement of the second wiper 33 is again accomplished by axially displacing the strip 34. However, in this embodiment the axial displacement is not only dependent on the preselected F-stop value but also on the film speed. Both values being correlated in a differential gearing (not shown) of which the strip 34 is the driven member.

What is claimed is:

1. Apparatus for electronic exposure control for photographic cameras with measurement of the object brightness through the camera lens having a Wheatstone bridge circuit with a first resistance and a diagonal branch as the measuring circuit and an electronic timing circuit having a second resistance and a capacitor for closing the camera shutter at the end of the exposure period and having a shutter release, the apparatus comprising:

a. a variable exponential resistance (VR) with a plurality of windings having a first wiper (14) and a second wiper (13) isolated from one another, said first wiper electrically connected to said bridge circuit, said second wiper electrically connected to said timing circuit, both wipers adjustable in their position relative to one another in accordance with the speed of the film used and being jointly movable across said windings (12), said first wiper and a portion of said windings defining said first resistance and said second wiper and said portion of said windings defining said second resistance;

b. electric switching means (9, 10, 11) mechanically connected to said shutter release for electrically connecting said first wiper to said bridge circuit when said shutter release is in its inoperative position and for electrically connecting said second wiper to said timing circuit when said shutter release is in its operative position;

c. a photoelectric resistance (PR) in said bridge circuit varying the current flow in the bridge in accordance with the object brightness;

d. a current indicator (G) connected in said diagonal branch of the bridge for indicating the balance of the bridge;

e. an RC-combination in said timing circuit defined by said second resistance and said capacitor;
f. a Schmitt trigger (7) in said timing circuit controlled by said RC-combination; and
g. a solenoid (8) in said timing circuit energized by said trigger in dependence on the voltage level of said capacitor in said RC-combination.

2. The apparatus as defined in claim 1, for electronic exposure control in single lens reflex cameras having means for preselecting F-stop values further comprising mechanical means for interconnecting said means for preselecting F-stop values with said second wiper and the position of the second wiper relative to the first wiper is adjusted an additional amount when the F-stop value is preselected.

3. The apparatus as defined in claim 2, wherein said mechanical means is a twisted metal strip with non-uniform pitch inserted in a rectangular hole at the center of said second wiper.

4. Apparatus for electronic exposure control in a photographic camera with measurement of the object brightness through the camera lens having a Wheatstone bridge circuit with a first resistance and a diagonal branch as the measuring circuit and an electronic timing circuit having a second resistance and a capacitor for closing the camera shutter at the end of the exposure period and having a shutter release, the apparatus comprising:
   a. a ring-shaped variable exponential resistance (VR) with a plurality of windings having a first wiper (14) and a second wiper (13) isolated from one another, said first wiper electrically connected to said bridge circuit, said second wiper electrically connected to said timing circuit, both wipers adjustable in their position relative to one another in accordance with the speed of the film used and being jointly movable across said windings (12), said first wiper and a portion of said windings defining said first resistance and said second wiper and said portion of said windings defining said second resistance;
   b. electric switching means (9, 10, 11) mechanically connected to said shutter release for electrically connecting said first wiper to said bridge circuit when said shutter release is in its inoperative position and for electrically connecting said second wiper to said timing circuit when said shutter release is in its operative position;
   c. a film speed setting knob (16) on said camera with first dtents connected by a solid shaft with said first wiper and a time setting knob (15) on said camera with second detents cooperating with said first detents for securing the position of said knobs relative to one another, said time setting knob connected with said second wiper by a hollow shaft surrounding said solid shaft, said shafts coaxial with said ring-shaped resistance;
   d. a photoelectric resistance (PR) in said bridge circuit varying the current flow in the bridge in accordance with the object brightness;
   e. a current indicator (G) connected in said diagonal branch of the bridge for indicating the balance of the bridge;
   f an RC-combination in said timing circuit defined by said second resistance and said capacitor;
   g. a Schmitt trigger (7) in said timing circuit controlled by said RC-combination; and
   h. a solenoid (8) in said timing circuit energized by said trigger in dependence on the voltage level of said capacitor in said RC-combination.

5. Apparatus for electronic exposure control in a photographic camera with measurement of the object brightness through the camera lens having a wheatstone bridge circuit with a first resistance and a diagonal branch as the measuring circuit, an electronic timing circuit having a second resistance and a capacitor for closing the camera shutter at the end of the exposure period and means for preselecting F-stop values, the apparatus comprising:
   a. a ring-shaped variable exponential resistance (VR) with a plurality of windings having a first wiper (33) and a second wiper (32) isolated from one another, said first wiper electrically connected to said bridge circuit, said second wiper electrically connected to said timing circuit, both wipers adjustable in their position relative to one another in accordance with the speed of the film used and being jointly movable across said windings (12), said first wiper and a portion of said windings defining said first resistance and said second wiper and said portion of said windings defining said second resistance;
   b. a film speed setting knob (30) on said camera connected with said first wiper by a first hollow shaft (30a), a time setting knob (31) on said camera connected with said second wiper by a second hollow shaft (31a), said second shaft concentric around said first shaft and both shafts coaxial with said ring-shaped resistance, said second hollow shaft having a rectangular bore in axial direction;
   c. a twisted strip having a rectangular cross section connected to said means for preselecting F-stop values and said first wiper rotatable on said first hollow shaft having a rectangular hole through which said twisted strip extends, said twisted strip is rotatable together with said film speed setting knob and is axially displaceable by said means for preselecting F-stop values and both movements result in a rotation of said first wiper;
   d. a photoelectric resistance (PR) in said bridge circuit varying the current flow in the bridge in accordance with the object brightness;
   e. a current indicator (G) connected in said diagonal branch of the bridge for indicating the balance of the bridge;
   f. an RC-combination in said timing circuit defined by said second resistance and said capacitor;
   g. a Schmitt trigger (7) in said timing circuit controlled by said RC-combination; and
   h. a solenoid (8) in said timing circuit energized by said trigger in dependence on the voltage level of said capacitor in said RC-combination.

6. Apparatus for electronic exposure control in a photographic camera with measurement of the object brightness through the camera lens having a wheatstone bridge circuit with a first resistance and a diagonal branch as the measuring circuit, an electronic timing circuit having a second resistance and a capacitor for closing the camera shutter at the end of the exposure period, means for preselecting F-stop values and means for setting film speed, the apparatus comprising:
   a. a ring-shaped variable exponential resistance (VR) with a plurality of windings having a first wiper (33) and a second wiper (32) isolated from one another, said first wiper electrically connected to said bridge circuit, said second wiper electrically connected to said timing circuit, both wipers adjustable in their position relative to one another in accordance with the speed of the film used and being jointly movable across said windings (12), said first wiper and a portion of said windings defining said first resistance and said second wiper and said portion of said windings defining said second resistance;
   b. a time setting knob (31) on said camera connected rigidly with said second wiper by a hollow shaft (31a) coaxial with said ring-shaped resistance and having a rectangular bore in axial direction and said first wiper rotatable on said hollow shaft;
   c. a twisted strip having a rectangular cross section connected to said means for preselecting F-stop values and said first wiper having a rectangular hole through which said twisted strip extends, said twisted strip is axially displaceable by said means for preselecting F-stop values and said means for setting film speed resulting in a rotation of said first wiper;
   d. a photoelectric resistance (PR) in said bridge circuit varying the current flow in the bridge in accordance with the object brightness;
   e. a current indicator (G) connected in said diagonal branch of the bridge for indicating the balance of the bridge;
   f. an RC-combination in said timing circuit defined by said second resistance and said capacitor;

g. a Schmitt trigger (7) in said timing circuit controlled by said RCtcombination; and h. a solenoid (8) in said timing circuit energized by said trigger in dependence on the voltage level of said capacitor in said RC-combination.

* * * * *